United States Patent
Kerner et al.

(10) Patent No.: US 6,998,812 B2
(45) Date of Patent: Feb. 14, 2006

(54) METHOD FOR DETERMINING THE MASS MOMENT OF INERTIA OF AN ELECTRIC MOTOR DRIVE SYSTEM

(75) Inventors: Norbert Kerner, Traunwalchen (DE); Eugen Kellner, Berchtesgaden (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/637,716

(22) Filed: Aug. 8, 2003

(65) Prior Publication Data

US 2004/0100219 A1    May 27, 2004

(30) Foreign Application Priority Data

Aug. 8, 2002   (DE)   ................. 102 36 847

(51) Int. Cl.
*B64C 17/02*   (2006.01)
*G05D 13/00*   (2006.01)
*H02P 7/00*   (2006.01)

(52) U.S. Cl. ............. 318/648; 318/648; 318/650; 318/432; 318/433; 318/434; 388/930

(58) Field of Classification Search ............ 318/648, 318/650, 651, 432, 433, 434; 388/930
See application file for complete search history.

(56) References Cited

U.S. PATENT DOCUMENTS

| | | | |
|---|---|---|---|
| 4,202,205 A | | 5/1980 | Carpenter |
| 4,607,408 A | | 8/1986 | Didier et al. |
| 4,649,328 A | * | 3/1987 | Leonard et al. ............. 318/271 |
| 4,741,182 A | | 5/1988 | Didier et al. |
| 4,827,197 A | * | 5/1989 | Giebeler ........................ 318/3 |
| 5,175,483 A | * | 12/1992 | Fujii et al. .................. 318/807 |
| 5,477,114 A | * | 12/1995 | Yamada et al. ............. 318/457 |
| 6,037,736 A | | 3/2000 | Tsuruta et al. |
| 6,144,181 A | * | 11/2000 | Rehm et al. ................ 318/329 |

(Continued)

FOREIGN PATENT DOCUMENTS

| | | |
|---|---|---|
| DE | 28 02 224 A1 | 7/1979 |
| EP | 1088674 A1 * | 4/2001 |
| EP | 0 827 265 B1 | 4/2002 |

(Continued)

OTHER PUBLICATIONS

European Search Report dated Nov. 13, 2003 for 03016287.9-2207.

(Continued)

*Primary Examiner*—Marlon T. Fletcher
*Assistant Examiner*—Patrick Miller
(74) *Attorney, Agent, or Firm*—Brinks Hofer Gilson & Lione

(57) ABSTRACT

A method for determining the mass moment of inertia of an electric motor drive system of a machine, having a drive motor and further drive elements arranged downstream of the drive motor. The method includes a) determining a compensation current, which compensates losses occurring at a constant speed of the motor, so that a motor speed of the drive motor remains constant and b) determining an acceleration current, which generates a defined acceleration of the drive motor when the losses occurring at the constant speed of the drive motor are compensated. The method further entails c) calculating a mass moment of inertia of the electric motor drive system based on the determined acceleration current.

21 Claims, 3 Drawing Sheets

U.S. PATENT DOCUMENTS

| | | | |
|---|---|---|---|
| 6,470,225 B1 * | 10/2002 | Yutkowitz | 700/44 |
| 6,611,125 B2 * | 8/2003 | Nagata et al. | 318/727 |
| 6,877,837 B1 * | 4/2005 | Igarashi et al. | 347/37 |
| 2004/0174124 A1 * | 9/2004 | Lee | 318/139 |

FOREIGN PATENT DOCUMENTS

| | | |
|---|---|---|
| FR | 2 631 988 A1 | 12/1989 |
| JP | 08140386 A * | 5/1996 |
| JP | 2001169584 A * | 6/2001 |
| JP | 2003210888 A * | 7/2003 |

OTHER PUBLICATIONS

Dr. Johannes Heidenhain GmbH prospectus entitled "iTNC 530 Contouring Control—Features and Specifications for the Machine Manufacturer," published by Dr. Johannes Heidenhain GmbH, May 2002, pp. 39-40.

Dr. Johannes Heidenhain GmbH prospectus entitled "Bahnsteuerung iTNC 530—Technische Daten und Spezifikationen fur den Maschinen-Hersteller," published by Dr. Johannes Heidenhain GmbH, May 2002, pp. 39-40.

* cited by examiner

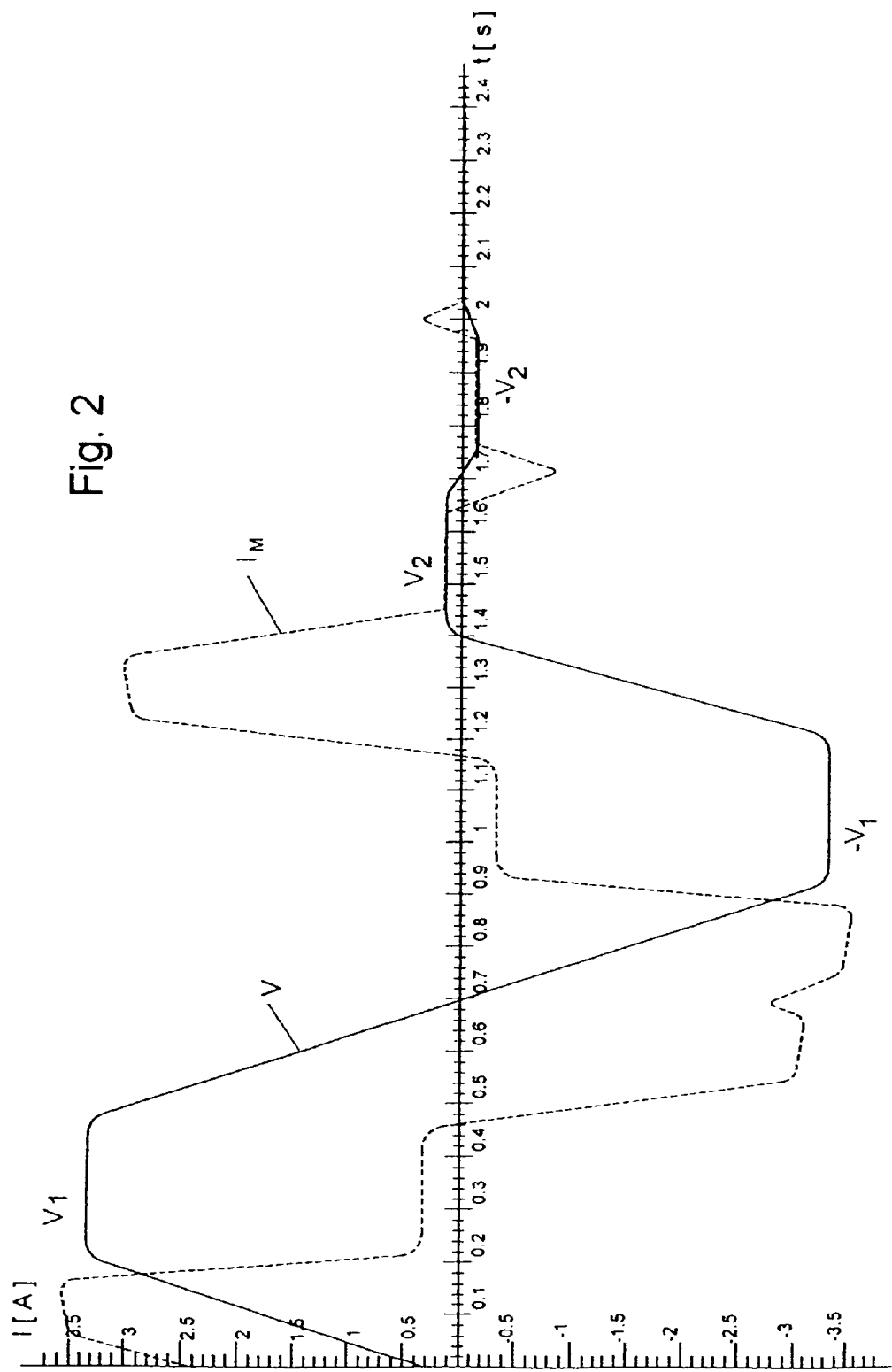

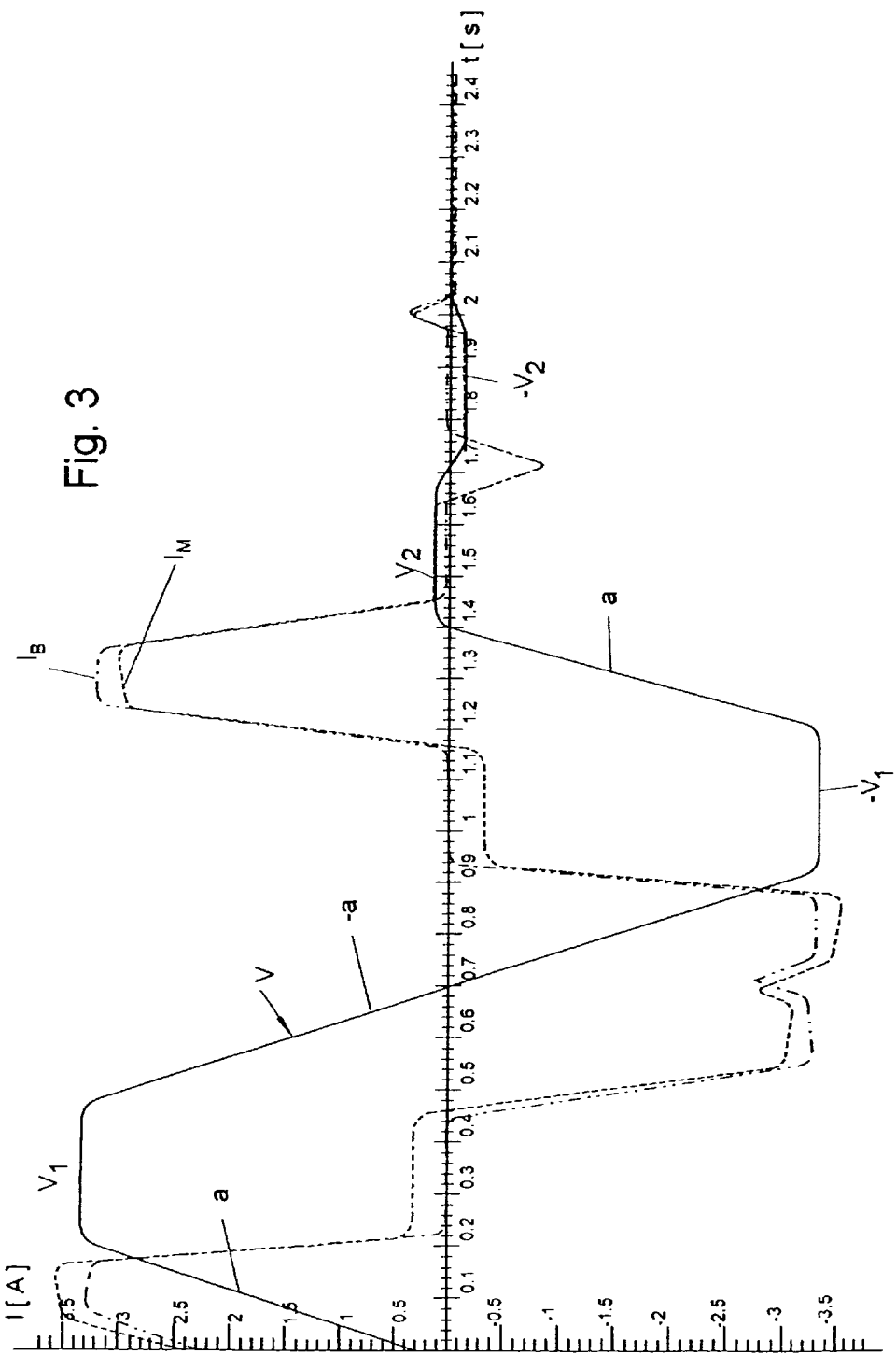

METHOD FOR DETERMINING THE MASS MOMENT OF INERTIA OF AN ELECTRIC MOTOR DRIVE SYSTEM

Applicants claim, under 35 U.S.C. §119, the benefit of priority of the filing date of Aug. 8, 2002 of a German patent application, copy attached, Ser. No. 102 36 847.3, filed on the aforementioned date, the entire contents of which is incorporated herein by reference.

BACKGROUND OF THE INVENTION

1. Field of the Invention

The present invention relates to a method for determining the mass moment of inertia of an electric motor drive system of a machine, in particular a machine tool, which includes a drive motor and further drive elements arranged downstream of the drive motor.

2. Discussion of Related Art

For assessing the dynamic machine layout, the ratio of the mass moment of inertia of the motor (which is related in a strict sense to the drive motor, i.e. its rotor, and which, in connection with a rotary drive mechanism, is equal to the mass moment of inertia of the rotor) to the mass moment of inertia of the load (which relates to the remaining components of the electric motor drive, for example a clutch, a ballscrew, further gear elements, a table which can be moved by the drive mechanism, etc.) must be known. The mass moment of inertia of the motor and the mass moment of inertia of the load must have a defined relationship to each other in order to achieve a high quality of the control of the electric motor drive mechanism.

The quotient of mass moment of inertia of the motor and mass moment of inertia of the load is a definitive quantity for judging the control capability, as well as the control quality of an electric motor drive system. If the quotient lies outside the range wherein it allows a high-quality control, steps for further optimizing the control often do not bring the desired success.

Moreover, from the (total) mass moment of inertia of the drive system, i.e. the sum of the mass moment of inertia of the motor and the mass moment of inertia of the load, and taking into consideration the maximum current for the drive motor, it is also possible to calculate the maximally achievable acceleration. Customarily a value between 1 and 2 is desired for the quotient of the mass moment of inertia of the motor and the mass moment of inertia of the load. As a rule, this is already being taken into consideration in the course of producing a machine, for example a machine tool, by the manufacturer. However, subsequent changes in marginal values such as, for example, a later change of a component of the machine, lead to changes of the quotient, so that it can assume a value outside of the desired range. After changes in a machine have been made, this can in turn lead to having to use a different drive motor in order to make the control of the drive mechanism possible with sufficient quality.

Since in the strict sense the value of the mass moment of inertia of the drive motor is known as a rule and represents a constant quantity (provided no changes were made in the drive motor itself), it is sufficient to determine the mass moment of inertia of the electric motor drive mechanism as a whole. If the mass moment of inertia of the motor is subtracted therefrom, the result is the mass moment of inertia of the load, which in turn allows the calculation of the actual value of the quotient of the mass moment of inertia of the motor and the mass moment of inertia of the load.

A determination system for a control constant of an electric motor used for driving a machine tool is described in EP 0 827 265 B1 for determining control constants by which it is possible, inter alia, to determine the mass moment of inertia. In this case an iterative method is employed, which is based on a correction model and the inclusion of control deviations in the course of controlling the motor. However, an iterative method always has the disadvantage that it is limited with respect to its accuracy, and furthermore, because of its proneness to errors, it does not necessarily lead to an optimal result for all operational states. Note that EP 0 827 265 B1 corresponds to U.S. Pat. No. 6,037,736, the entire contents of which are incorporated herein by reference.

OBJECT AND SUMMARY OF THE INVENTION

It is therefore an object of the present invention to make available a novel, improved method for determining the mass moment of inertia of an electric motor drive system for a machine, in particular a machine tool.

In accordance with the present invention, this object is attained by a method for determining the mass moment of inertia of an electric motor drive system of a machine, having a drive motor and further drive elements arranged downstream of the drive motor. The method includes a) determining a compensation current, which compensates losses occurring at a constant speed of the motor, so that a motor speed of the drive motor remains constant and b) determining an acceleration current, which generates a defined acceleration of the drive motor when the losses occurring at the constant speed of the drive motor are compensated. The method further entails c) calculating a mass moment of inertia of the electric motor drive system based on the determined acceleration current.

Accordingly, first a compensation current of the drive system is determined, which compensates losses occurring at constant motor speed, and this in such a way that at constant motor speed no further current demand exists in addition to the compensation current. Thereafter the acceleration current is determined, which generates a defined (constant) motor acceleration when losses occurring at constant motor speed have been compensated. Finally, the mass moment of inertia is calculated from this acceleration current.

An analytical method for determining the mass moment of inertia of an electric motor drive mechanism is made available by the method of the present invention, with which the mass moment of inertia is determined from the acceleration current which generates a defined number of revolutions of the motor when the losses occurring at constant motor speed (motor rpm) are compensated. This means that the acceleration current is a current which exclusively causes the acceleration of the motor. Those portions of the current which are used for compensating losses at constant motor speed, in particular losses due to friction and magnetic reversal, are considered as compensation current separate from the acceleration current.

Thus, the prior determination of the compensation current required for operating the drive mechanism at constant motor speed is a prerequisite for calculating the mass moment of inertia from the acceleration current. The compensation current is determined in that the drive mechanism is operated at least two different motor speeds, which are constant during a predetermined length of time and preferably have the same value, but opposite signs. The compensation current which is required for maintaining the motor speed constant at a predetermined value can be determined from this, i.e. which completely compensates losses occurring during the operation at constant motor speed, so that no reduction of the motor speed due to losses occurs.

In a preferred further development of the present invention, the drive mechanism is operated at four different motor speeds for determining the compensation current, respectively two of which have the same value, but opposite signs.

If a control device is assigned to the electric motor drive mechanism, by which the number of revolutions of the drive motor are controlled, the compensation current corresponds to the feedforward current by which the rpm control device compensates losses which occur in the course of the operation of the drive mechanism at constant motor speed. The operation of an electric motor drive mechanism with speed feedforward is known, reference is made to a Heidenhain prospectus for path control iTNC 530 (May 2002) in connection with this.

Thus, in a controlled drive system only those values are required for determining the mass moment of inertia which are required anyway for controlling the drive mechanism. Thus, no additional values which would have to be determined especially for determining the mass moment of inertia are required.

For determining the acceleration current, the drive mechanism is preferably operated at two different motor accelerations, each of which is constant for a predetermined length of time and carries the opposite sign. In this case the acceleration current is that current which alone is required for motor acceleration, i.e. the difference between the total current required in the operation of the electric motor drive mechanism (total torque current) and the current needed for compensating losses (compensation current or feedforward current).

For calculating the mass moment of inertia from the acceleration current, the motor acceleration is represented, on the one hand, as a function of the acceleration current and, on the other hand, as a function of the mass moment of inertia, and these two formulations are treated as being equivalent of the motor acceleration. The corresponding equation can then be resolved for the mass moment of inertia, so that the result is an equation for the mass moment of inertia as a function of the previously measured acceleration current.

For representing the motor acceleration as a function of the acceleration current, it is possible in case of a controlled electric motor drive mechanism to employ the so-called acceleration feedforward, which provides the ratio between the acceleration current and the motor acceleration, in particular the angular acceleration, as a constant parameter. Thus, the acceleration feedforward is a measure for the amount of acceleration current required for achieving a defined motor acceleration. As described above, this quantity can be determined when the compensation current is known, i.e. those portions of the total torque current which are required for compensating losses at constant motor acceleration.

For representing the motor acceleration as a function of the mass moment of inertia the physical law is used, in accordance with which the acceleration is equal to the quotient of the effective drive moment (for example the torque) and the moment of inertia of the drive mechanism. In this case the electrical drive torque in turn can be represented as the product of the acceleration current and a motor constant which, in case of a rotating drive motor, is called torque constant. From this results the representation of the motor acceleration as a function of the mass moment of inertia.

When the mass moment of inertia of the drive system as a whole has been determined, it is possible to calculate the mass moment of inertia of the load by subtracting the (known, constant) mass moment of inertia of the motor from the mass moment of inertia of the drive system. This in turn allows the calculation of the quotient of the mass moment of inertia of the motor and the mass moment of inertia of the load. This quotient is then displayed by an output device, for example visually (by a screen, a printer, or the like), or acoustically, so that the quotient is directly available and a check can be made whether, as an important characteristic, it lies within a defined advantageous value range.

The method is not only suitable for electric motor drives of machines which have a rotor, but also for drive mechanisms with a linear motor and so-called direct drives. Further characteristics and advantages of the present invention will become apparent in the course of the following description of an exemplary embodiment by the drawings.

BRIEF DESCRIPTION OF THE DRAWINGS

FIG. 2 is a representation of a possible current occurring in the course of operating a machine tool pursuant to the method of FIG. 1; and FIG. 3 is a representation in accordance with FIG. 2, wherein the acceleration current is additionally represented which causes the motor acceleration following the compensation of losses pursuant to the method of FIG. 1.

DETAILED DESCRIPTION OF THE PREFERRED EMBODIMENTS

Figure 1:
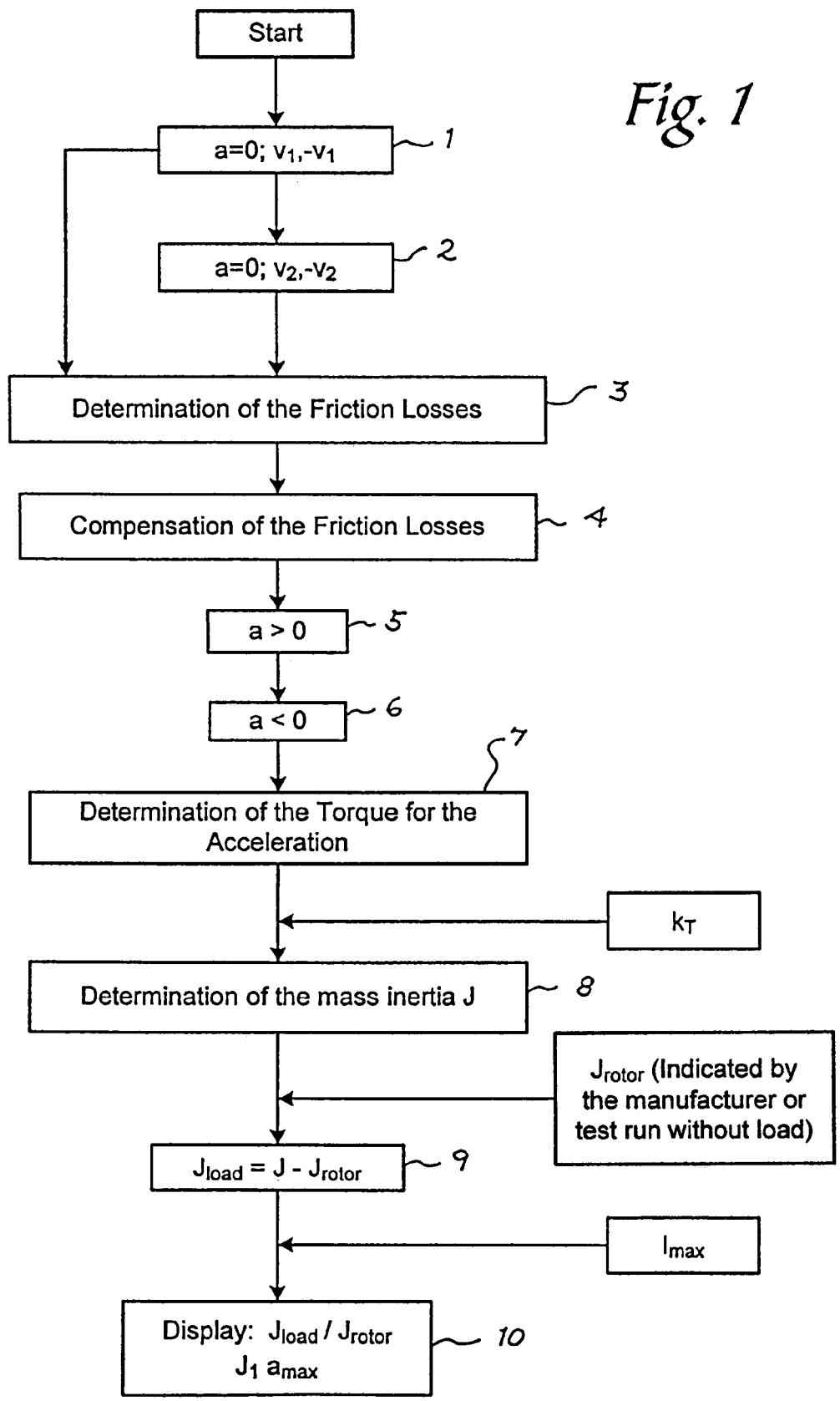
FIG. 1 is a schematic representation in the form of a flow chart of an embodiment of a method for determining the mass moment of inertia of an electric motor drive system in accordance with the present invention.

The following description of an exemplary embodiment of the method of the present invention by FIGS. 1 to 3 is based on an electric motor drive system for a machine tool, including a drive motor, as well as components connected downstream of the drive motor, such as, for example, a clutch, a ballscrew, gear elements and a table of the machine tool which is to be translationally moved. By determining the resultant mass moment of inertia of this drive system, it is possible to determine the quotient of the mass moment of inertia of the motor and the mass moment of inertia of the load. The mass moment of inertia of the motor is a constant which is known for the respective type of motor and is usually disclosed by the manufacturer. The mass moment of inertia of the load results from subtracting the mass moment of inertia of the motor from the mass moment of inertia of the drive system as a whole. This in turn makes possible the determination of the quotient of the mass moment of inertia of the motor and the mass moment of inertia of the load.

In accordance with the first two steps 1, 2 in the flow chart in FIG. 1, the drive motor is initially accelerated to a first constant speed $v_1$, and is operated at this speed for a predetermined length of time, and is subsequently braked and accelerated to the opposite identical speed $-v_1$ and again operated at this speed for a predetermined length of time. Thereafter, the drive mechanism is accelerated to a lower speed $v_2$ and is again operated at this speed for a predetermined length of time, is braked thereafter, then accelerated to the opposite identical speed $-v_2$ and again operated at this speed for a predetermined length of time.

The speeds $v_1$, $-v_1$ represent the typical operating forward feed of the respective machine tool, which is operated for a defined length of time at this forward feed. The opposite speeds $v_1$, $-v_1$ respectively correspond to a forward feed at the same speed, but in the opposite direction.

The motor speed v of the drive mechanism is represented in FIG. 2 as a function of the time t. Four areas of different constant velocity $v_1$, $-v_1$, $v_2$ and $-v_2$, which correspond to the above explained motor speeds, can be seen in particular. Furthermore, the total torque current $I_M$, which is required for attaining the four different constant motor speeds $v_1$, $-v_1$, $v_2$, as well as $-v_2$, as well as maintaining them at a constant level for a defined length of time, is represented as a function of the time in FIG. 2. Acceleration portions are contained in the resulting torque current $I_M$, as well as such portions of the current which cause an acceleration for changing the motor speed, as well as loss portions necessary for compensation friction losses, as well as further rpm-dependent losses, such as losses due to magnetic reversal. This becomes clear in that in accordance with FIG. 2 even when operating the drive mechanism at a constant speed $v_1$, $-v_1$, $v_2$ or $-v_2$, the resulting torque current of the drive motor is not equal to zero. Thus, a defined amount of current (compensation current) is required in order to maintain a constant motor speed by compensating losses, and therefore a constant forward feed of the machine tool.

The losses occurring in the course of operating the drive motor at a constant speed, as well as the current required for compensating these losses, can be determined in the next method step 3 in that the so-called integral current is evaluated during the constant operation phases of the drive motor, or of the machine tool, i.e. during those phases in which the motor speed, or the forward feed of the machine tool, are respectively constant. The integral current is the total torque current reduced by the proportional amount of the current (noise). This allows the setting 4 of a feedforward current, which compensates the friction losses and other rpm-dependent losses appearing during constant motor speed.

In the course of the further testing operation, the machine tool is again operated sequentially at the four different motor speeds mentioned above ($v_1$, $-v_1$, as well as $v_2$, $-v_2$) during the subsequent steps 5, 6 of the method in accordance with the present invention. In connection with this testing operation, the motor speed v, the resulting torque current $I_M$, as well as additionally the acceleration current $I_B$, are again represented in FIG. 3. It can be seen that the acceleration current $I_B$ equals zero every time the speed v is constant. Therefore the acceleration current $I_B$ only contains those portions of the current required for accelerating the drive mechanism. The compensation of losses takes place by a speed feedforward, which can be set by the control device of the drive mechanism.

During the second testing operation the electric motor drive mechanism is operated by the assigned control device in such a way that the acceleration is constant in the phases in which the motor speed is set to a first value (for example $v_1$), or is changed from a first value ($v_1$) to a second value ($-v_1$), i.e. it has (except for the respective starting or end phases of the acceleration) a constant value a, or $-a$. By evaluating the acceleration current $I_B$ during the phase of constant motor acceleration a, or $-a$, it is possible to determine what acceleration current $I_B$ is required for maintaining a defined constant motor acceleration a, or $-a$.

In a further method step 7, this now makes possible the determination of the so-called acceleration feedforward FF. This is a constant parameter which indicates which acceleration current $I_B$ must flow during an acceleration phase in order to achieve a defined angular acceleration $\alpha$ of the drive motor. The following applies: $FF=2\pi*I_B/\alpha$ This can be resolved for the angular acceleration $\alpha$, and the following applies: $\alpha=2*I_B/FF$.

On the other hand, in accordance with physical laws for a rotary movement it is also possible to represent the angular acceleration as $\alpha=M/J$. In this case M is the electric torque constant of the drive motor, for which $M=k_T*I_B$ applies. Here, $k_T$ is the torque constant of the drive motor, which usually is indicated by the manufacturer of the motor. If this is not the case, the torque constant $k_T$ can be easily calculated, which will be explained further below. Thus, $\alpha=k_T*I_B/J$ results as the second equation for the angular acceleration.

By equating the two above equations for the angular acceleration, the following results: $k_T/J=2\pi/FF$. This equation can be resolved for the mass moment of inertia J, so that $$J=k_T*FF/2\pi.$$

In this way the mass moment of inertia J is represented as a function of the torque constant $k_T$ of the drive motor, which is determined by its construction and the selection of the material of the motor and as a rule is disclosed by the manufacturer, as well as a function of the acceleration feedforward FF, which had been determined in the previous method steps 1 to 6.

Following the determination of the mass moment of inertia J of the drive system of the machine tool at 8, it is now possible in a simple manner to calculate the quotient of the mass moment of inertia of the motor and the mass moment of inertia of the load. The fact, that the total mass moment of inertia of a drive system is additively composed of the mass moment of inertia of the drive motor $J_M$ in the strict sense and the mass moment of inertia $J_L$ of the load $J_L$, is used for this. The mass moment of inertia of the load $J_L$ in turn results from the values which stem from the clutch, ballscrew, drive elements, as well as a translationally movable table of the machine tool, for example. Accordingly, $J_L=J-J_M$, wherein the mass moment of inertia of the motor $J_M$ is known as a rule. If necessary, this mass moment of inertia of the motor $J_M$ can be determined in the same way as the mass moment of inertia of the drive system as a whole, in that the above described test operations of the drive motor are performed without a load, i.e. for its rotor, and are evaluated in the same way as described above.

For a rotating drive motor the mass moment of inertia is equal to the mass moment of inertia of the rotor.

Following the determination of the mass moment of inertia of the load from the previously determined total mass moment of inertia J and the mass moment of inertia of the motor $J_M$ at 9, the required quotient $J_M/J_L$ of the mass moment of inertia of the motor and the mass moment of inertia of the load results in the last step 10.

In the same way the maximum acceleration $a_{max}$ of the motor is determined from the maximum current $I_{max}$, which is present anyway as a numerical value in the machine control. Then the required quotient, together with the mass moment of inertia J of the drive system and the maximum acceleration $a_{max}$ of the motor is displayed to a user directly on a monitor. Thus, the user can read out the quotient $J_M/J_L$ of the mass moment of inertia of the motor and the mass moment of inertia of the load directly and without elaborate (manually performed) calculations of his own, wherein no input data are requested from the user which would not otherwise be required for operating the control of the drive system.

As indicated above, the torque constant $k_T$ of the respective drive motor had been used for calculating the resulting mass moment of inertia J from the acceleration current, or the acceleration feedforward. If it should not have been indicated by the manufacturer, it can be calculated from the stationary torque $M_0$ and the stationary current $I_0$ of the drive motor: $k_T=M_0/I_0$.

If the stationary torque should also be unknown, the torque constant can be calculated by equating the electrical motor output and the mechanical motor output. The following applies for the electrical motor output of a three-phase current motor in the equivalent current star diagram: $P_{el}=3*U*I$, with $U=n*U_c$, wherein $U_c$ is the rpm-dependent voltage constant, and n is the number of revolutions of the drive motor.

$P_{mech}=M*\Omega$, with $M=k_T*J$ and $\Omega=2\pi*n$, applies for the mechanical motor output.

By equating the electrical and mechanical motor output, the following therefore results: $3*n*U_c*I=2\pi*k_T*n*I$. From this follows that $k_T=3*U_c/2\pi$, wherein $U_c=U_0/\sqrt{3}*n_{Pol}/F_n$. Here, $U_0$ (idling voltage of the drive motor, corresponding to the effective voltage between the phases), $n_{Pol}$, (number of pole pairs of the drive motor), as well as $F_n$ (nominal frequency) are each constant parameters.

As the result, the method in accordance with the present invention makes possible a direct analytical determination of the ratio of the mass moment of inertia of the motor and the mass moment of inertia of the load of a drive system of a machine tool.

This quotient is an important aid in the evaluation of the machine axis of a machine tool by an (external) adjusting tool. Further than that, it can be used for an adaptive updating of the control parameters of a control device of the drive system, as well as for feedforward. If, for example, it is discovered in the course of operating a machine tool that the torque current required for setting a defined acceleration changes during the acceleration phase, a re-determination of the acceleration feedforward, as well as of the total mass moment of inertia is performed in accordance with the above described method. The control factors are then also changed (in particular proportionally) in accordance with the change in the mass moment of inertia. The dynamics of the drive system are kept constant by this.

Further exemplary embodiments exist within the scope of the present invention besides the described examples.

We claim:

1. A method for determining a mass moment of inertia of an electric motor drive system of a machine, comprising a drive motor and further drive elements arranged downstream of said drive motor, the method comprising:
   a) determining a compensation current, which compensates losses occurring at a constant motor speed of said motor, so that said motor speed of said drive motor remains constant, wherein said determining said compensation current comprises determining current required for driving said drive motor at said constant motor speed at least two different motor speeds;
   b) determining an acceleration current, which generates a defined acceleration of said drive motor when said losses occurring at said constant speed of said drive motor are compensated; and
   c) calculating said mass moment of inertia of said electric motor drive system based on said determined acceleration current; and
   wherein said at least two motor speeds have the same value, but opposite signs.

2. The method in accordance with claim 1, wherein said determining said compensation current comprises sequentially operating said drive motor at four different speeds, of which respectively two have the same value, but opposite signs.

3. A method for determining a mass moment of inertia of an electric motor drive system of a machine, comprising a drive motor and further drive elements arranged downstream of said drive motor, the method comprising:
   a) determining a compensation current, which compensates losses occurring at a constant motor speed of said motor, so that said motor speed of said drive motor remains constant, wherein said determined compensation current is formed by the use of a feedforward current of a revolution speed controller;
   b) determining an acceleration current, which generates a defined acceleration of said drive motor when said losses occurring at said constant speed of said drive motor are compensated;
   c) calculating a torque constant of said drive motor;
   d) calculating said a mass moment of inertia of said electric motor drive system based on said calculated torque constant and said determined acceleration current; and
   e) controlling a number of revolutions of said drive motor.

4. A method for determining a mass moment of inertia of an electric motor drive system of a machine, comprising a drive motor and further drive elements arranged downstream of said drive motor, the method comprising:
   a) determining a compensation current, which compensates losses occurring at a constant motor speed of said motor, so that said motor speed of said drive motor remains constant;
   b) determining an acceleration current, which generates a defined acceleration of said drive motor when said losses occurring at said constant speed of said drive motor are compensated; and
   c) calculating said mass moment of inertia of said electric motor drive system based on said determined acceleration current, wherein said calculating comprises equating two formulations of said defined acceleration of said drive motor.

5. The method in accordance with claim 4, wherein said two formulations comprise representing said acceleration, on the one hand, as a function of said determined acceleration current, and on the other hand as a function of said mass moment of inertia.

6. A method for determining a mass moment of inertia of an electric motor drive system of a machine, comprising a drive motor and further drive elements arranged downstream of said drive motor, the method comprising:
   a) determining a compensation current, which compensates losses occurring at a constant motor speed of said motor, so that said motor speed of said drive motor remains constant;
   b) determining an acceleration current, which generates a defined acceleration of said drive motor when said losses occurring at said constant speed of said drive motor are compensated; and
   c) calculating said mass moment of inertia of said electric motor drive system based on said determined acceleration current, wherein said calculating comprises:
   determining a mass moment of inertia of a load of said drive system from a difference between a total mass moment of inertia of said drive system and a mass moment of inertia of said drive motor; and
   calculating a ratio of said mass moment of inertia of said drive motor to said mass moment of inertia of said load.

7. The method in accordance with claim 6, further comprising displaying said ratio.

8. The method in accordance with claim 7, wherein said displaying is a visual display.

9. The method in accordance with claim 7, wherein said displaying is an audio display.

10. A method for determining a mass moment of inertia of an electric motor drive system of a machine, comprising a drive motor and further drive elements arranged downstream of said drive motor, the method comprising:
   a) determining a compensation current, which compensates losses occurring at a constant motor speed of said motor, so that said motor speed of said drive motor remains constant, wherein said determining said compensation current comprises determining current required for driving said drive motor at said constant motor speed at least two different motor speeds, wherein said at least two motor speeds have the same value, but opposite signs;
   b) determining an acceleration current, which generates a defined acceleration of said drive motor when said losses occurring at said constant speed of said drive motor are compensated;
   c) calculating a torque constant of said drive motor; and
   d) calculating said a mass moment of inertia of said electric motor drive system based on said calculated torque constant and said determined acceleration current.

11. The method in accordance with claim 10, wherein said determining said compensation current comprises sequentially operating said drive motor at four different speeds, of which respectively two have the same value, but opposite signs.

12. A method for determining a mass moment of inertia of an electric motor drive system of a machine, comprising a drive motor and further drive elements arranged downstream of said drive motor, the method comprising:
   a) determining a compensation current, which compensates losses occurring at a constant motor speed of said motor, so that said motor speed of said drive motor remains constant;
   b) determining an acceleration current, which generates a defined acceleration of said drive motor when said losses occurring at said constant speed of said drive motor are compensated;
   c) calculating a torque constant of said drive motor; and
   d) calculating said a mass moment of inertia of said electric motor drive system based on said calculated torque constant and said determined acceleration current, wherein said calculating comprises equating two formulations of an acceleration of said drive motor.

13. The method in accordance with claim 12, wherein said two formulations comprise representing said acceleration, on the one hand, as a function of said determined acceleration current, and on the other hand as a function of said mass moment of inertia.

14. A method for determining a mass moment of inertia of an electric motor drive system of a machine, comprising a drive motor and further drive elements arranged downstream of said drive motor, the method comprising:
   a) determining a compensation current, which compensates losses occurring at a constant motor speed of said motor, so that said motor speed of said drive motor remains constant;
   b) determining an acceleration current, which generates a defined acceleration of said drive motor when said losses occurring at said constant speed of said drive motor are compensated;
   c) calculating a torque constant of said drive motor; and
   d) calculating said a mass moment of inertia of said electric motor drive system based on said calculated torque constant and said determined acceleration current, wherein said calculating of said mass moment of inertia comprises:
   determining a mass moment of inertia of a load of said drive system from a difference between a total mass moment of inertia of said drive system and a mass moment of inertia of said drive motor; and
   calculating a ratio of said mass moment of inertia of said drive motor to said mass moment of inertia of said load.

15. The method in accordance with claim 14, further comprising displaying said ratio.

16. The method in accordance with claim 15, wherein said displaying is a visual display.

17. The method in accordance with claim 15, wherein said displaying is an audio display.

18. A method for determining a control parameter of an electric motor drive system of a machine, comprising a drive motor and further drive elements arranged downstream of said drive motor, the method comprising:
   determining a mass moment of inertia of said electric motor drive system by:
   a) determining a compensation current, which compensates losses occurring at a constant motor speed of said motor, so that said motor speed of said drive motor remains constant;
   b) determining an acceleration current, which generates a defined acceleration of said drive motor when said losses occurring at said constant speed of said drive motor are compensated; and
   c) calculating said mass moment of inertia of said electric motor drive system based on said determined acceleration current, wherein said calculating said mass moment of inertia of said electric motor drive system comprises determining a mass moment of inertia of a load of said drive system from a difference between a total mass moment of inertia of said drive system and a mass moment of inertia of said drive motor, wherein said control parameter of said electric motor drive system is determined by a calculation based on said mass moment of inertia of a load of said electric motor drive system and said mass moment of inertia of said drive motor;
   determining said control parameter of said electric motor drive system by performing a calculation based on said mass moment of inertia of said electric motor drive system and a mass moment of inertia of said drive motor, wherein said control parameter of said electric motor drive system is determined by calculating a ratio of said mass moment of inertia of said drive motor to said mass moment of inertia of said load.

19. The method in accordance with claim 18, further comprising displaying said ratio.

20. The method in accordance with claim 19, wherein said displaying is a visual display.

21. The method in accordance with claim 19, wherein said displaying is an audio display.

* * * * *